United States Patent Office 3,268,749
Patented August 23, 1966

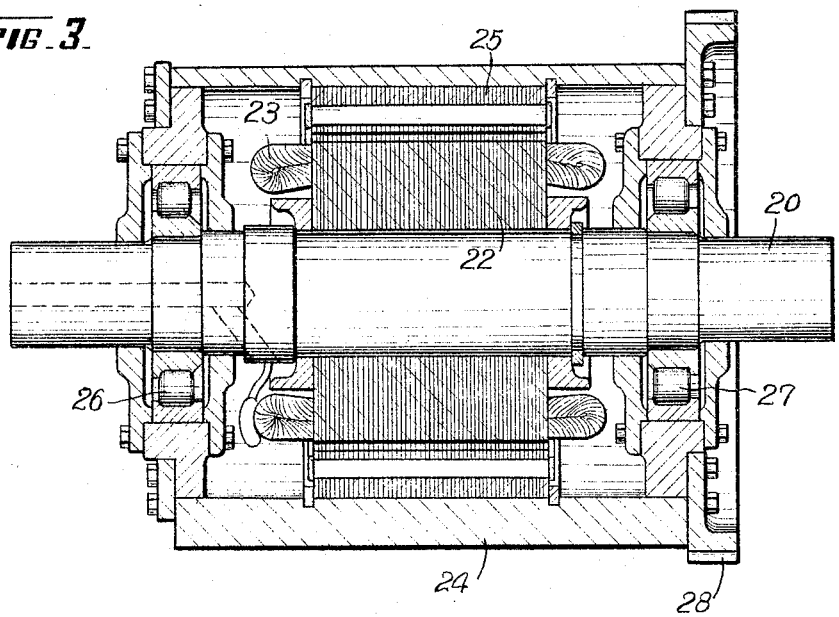
FIG. 3.
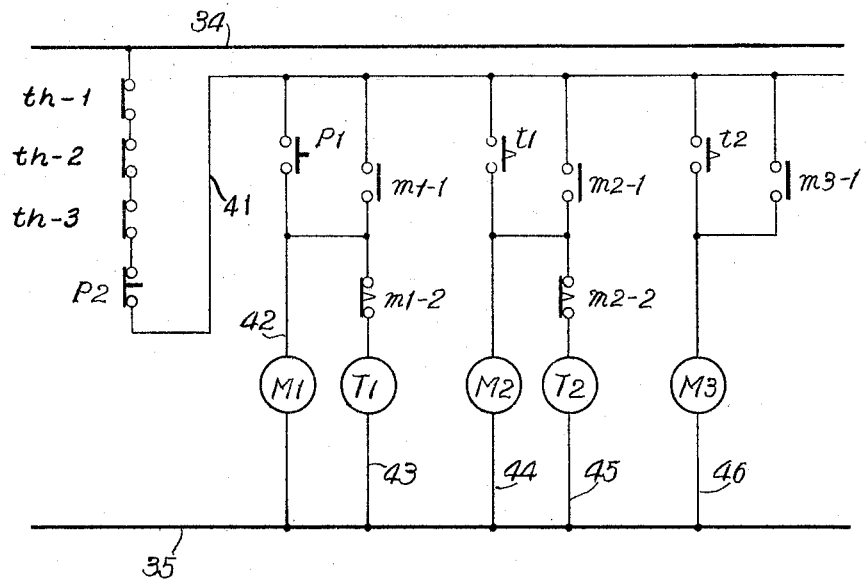
FIG. 6b. — CONTROL CIRCUIT

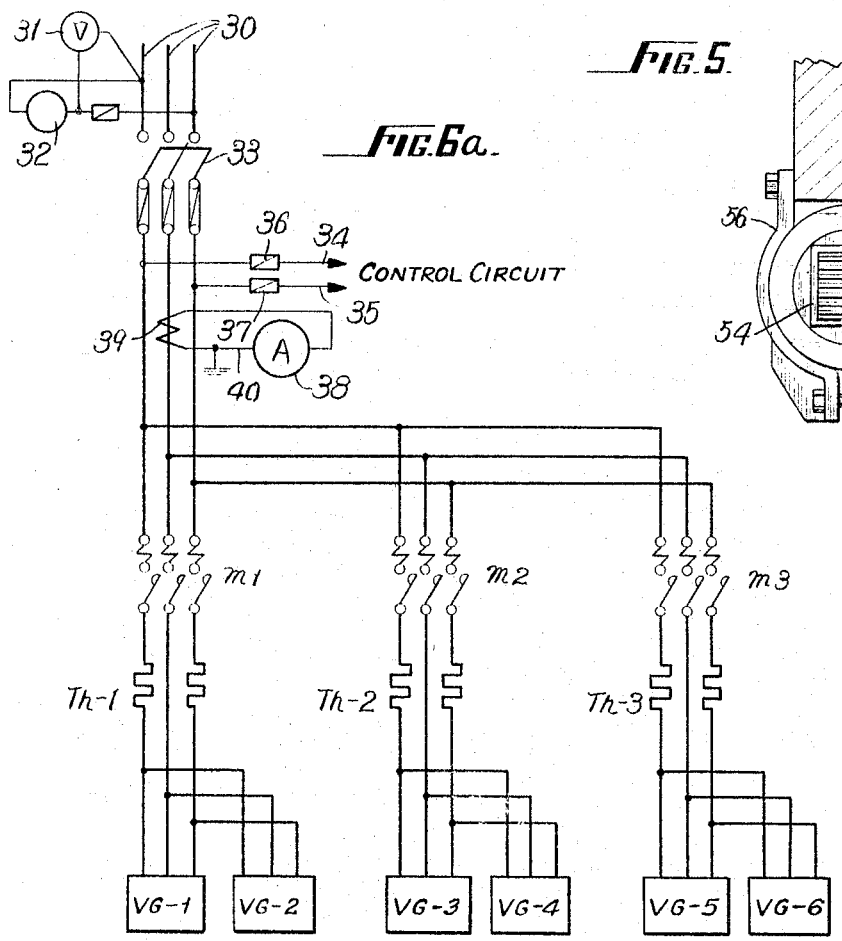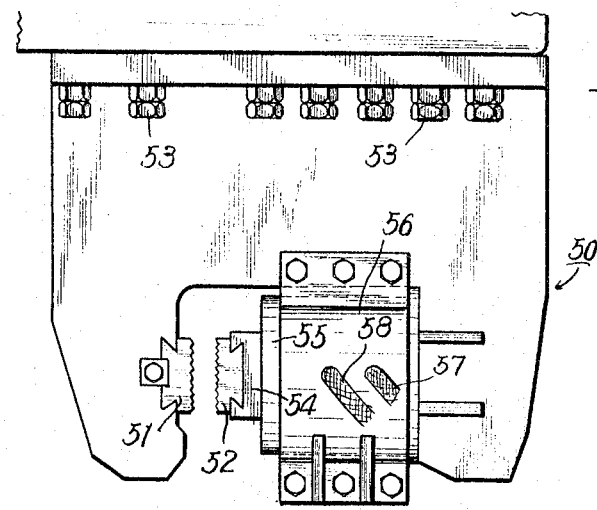

3,268,749
VIBRATION GENERATING DEVICE EMPLOYING DYNAMICALLY UNBALANCED ELECTRIC MOTORS
Hisashi Matsuo, Kyoto, Japan, assignor to Ohbayashi-Gumi, Ltd., Osaka, Japan, a corporation of Japan
Filed Mar. 16, 1965, Ser. No. 440,242
8 Claims. (Cl. 310—81)

This application is a continuation-in-part application to U.S. Serial No. 151,007, filed November 8, 1961, and now abandoned.

This invention relates generally to motor-driven vibration generators employing a plurality of eccentric masses which are so arranged that they produce effective centrifugal forces in certain desired directions while the produced centrifugal forces are balanced out in certain undesired directions. These vibration generators are presently in wide use in the various industrial fields and utilized in combination with pile drivers, vibration screens, tamping machines, sand stone cutters, sand piling machines and the like.

The conventional vibrator of the above kind is generally driven by a single electric motor which is mounted on the housing of the vibrator and rotation is transmitted from the drive motor through transmission means, preferably gearings, to the driven eccentric masses so as to rotate the latter in unison. It is clear therefore that when occasion requires a different capacity of the vibrator, a completely different vibrator unit must be employed so as to meet such occasional demands. This means a considerable drawback inherent in the conventional technique.

It is further clear that the provision of the single drive motor of the built-on type results in an unduly bulky construction of the vibrator.

It is therefore an object of this invention to provide a vibration generator capable of providing easy stepwise modification of the vibrator output.

A further object of the present invention is to provide a vibration generator of the above kind which has a plurality of drive motors arranged completely within the housing of the generator.

It is further clear that the sole drive motor of the conventional vibrator does not contribute per se in any way to generate directional centrifugal forces.

A still further object of the present invention is to provide a vibration generator of the above kind in which almost the whole of the rotor mass of each of the drive motors employed is utilized as an eccentric mass.

As is frequently encountered, the vibration generator of the above kind might be fed with currents of different frequencies, such as 50 and 60 cycles, as the job site is changed from one, to another place. If the vibrator be designed so as to operate at an optimum efficiency with 50-cycle current, an overload may naturally be caused to take place upon energization with 60-cycle current.

Still another object is to provide a vibration generator of the above kind which obviates such an overload, relying solely upon mechanical means.

The conventional vibrator has generally a specific configuration as a whole which limits a wide adaptability thereof to various purposes.

A further object is the provision of substantially perfect box configuration to the generator of the above type as a whole, thus increasing considerably its possibilities of application.

At still further object is to provide a vibration generator of the above kind which demands only a lower starting current at the time of the commencement of operation of the generator without using any conventional current limiters.

The above and further objects and features of the invention will become clear to those skilled in the art from the detailed description of the invention as set forth hereinafter referring to the accompanying drawings which illustrate a preferred embodiment of the vibration generator according to the invention.

Generally stated, the present invention contemplates division of the conventional sole drive motor into a number of smaller motor units arranged in several pairs completely within a box type housing. This housing is split into a plurality of elements and contains at least a pair of motor units positioned along each split plane of the split housing. Each of the motor units has a rotor in the form of an eccentric mass which is provided with electric windings and a core, and encloses, with gaps, a stator cooperating therewith.

The eccentric masses of each two rotors are arranged so as to produce a directional vibrator unit according to the conventional technique. Thus, the output of the generator as a whole may be easily, yet stepwise, modified by appropriate selection of the number of the thus established vibrator units assembled together. The assembled motor units are mechanically connected so as to operate in unison. By provision of proper switch gear, it is possible to energize only two motor units cooperating with each other in view of the directional balance of induced centrifugal forces, whereby the starting current at the commencement of operation of the generator can be considerably reduced in comparison with that required for a sole drive motor, without any use of starting compensator or the like. For frequency compensation, pairs of the eccentric masses are positioned in predetermined off-center, yet symmetrical, position so as to reduce the effective centrifugal forces.

In the drawings:

FIG. 3 is an enlarged longitudinal section of one of a plurality of eccentric rotor-motor units employed in the generator shown in FIGS. 1 and 2;

FIG. 4 is an elevational view of an additional hydraulically operated attachment for releasably gripping the head of a pile, which attachment is utilized when the vibration generator is used ts a pile driver;

FIG. 5 is a sectional view of the gripper attachment taken on the line V—V in FIG. 4;

FIGS. 6a and 6b are wiring diagrams for current feed from a commercial current network to the respective rotor-motor units employed in the generator;

FIGS. 7–14 are schematic views showing preferred possibilities of practical application of the novel vibration generator.

Figure 1:
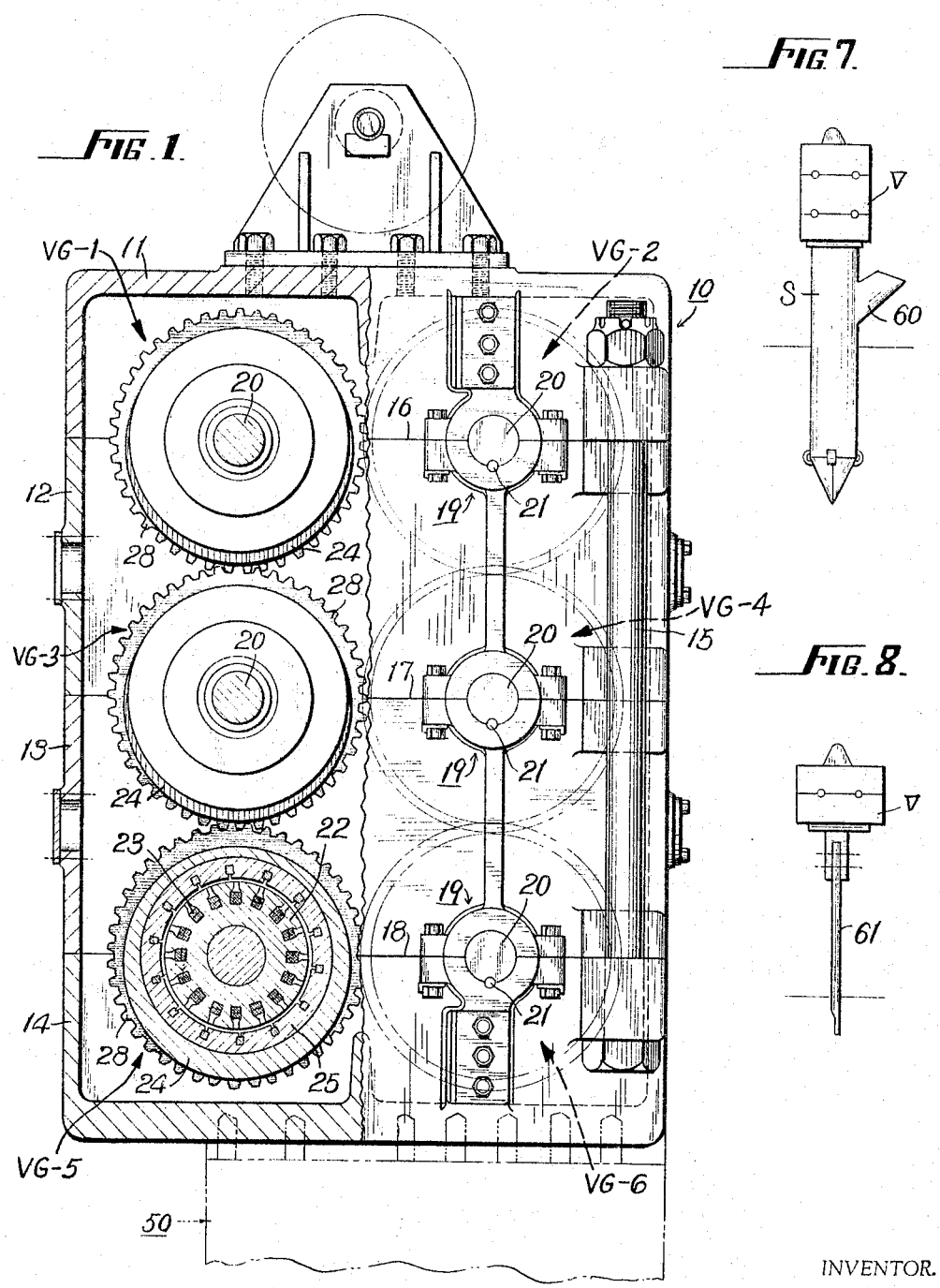
FIG. 1 is a longitudinal vertical section of the vibration generator wherein several constituents are represented in a highly simplified form and a rotor unit only is shown in its cross-section.
Figure 2:
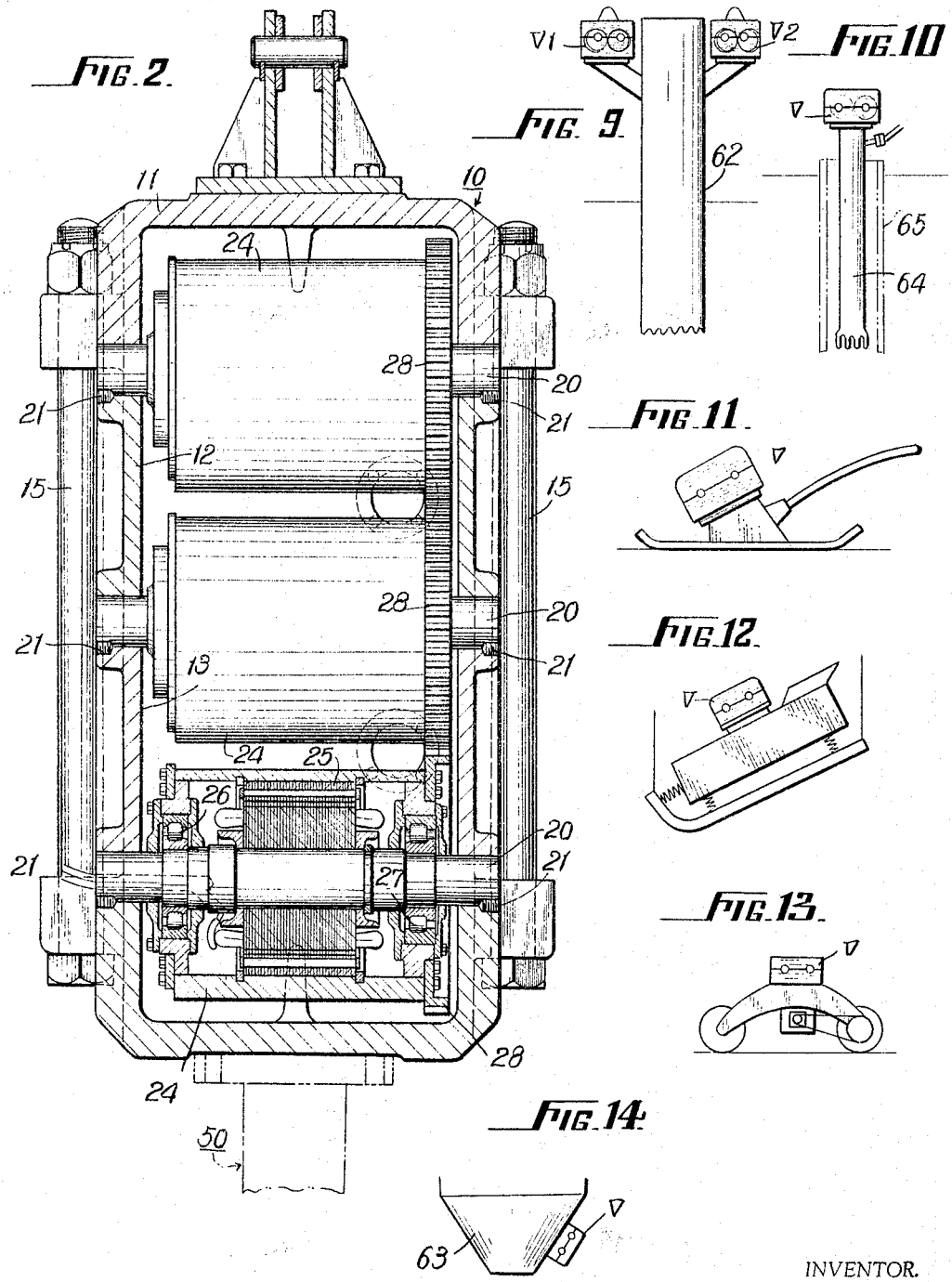
FIG. 2 is a vertical cross-section of the generator taken on a plane at right angles to that taken in the case of FIG. 1.

Referring now to the accompanying drawings, especially FIGS. 1 and 2 thereof showing a preferred embodiment of the vibration generator according to the invention, numeral 10 designates generally a housing assembly comprising four horizontally split sections 11–14 fabricated from iron castings and united rigidly into a hollow box as shown by means of four strong tie bolts 15. There are thus three separate horizontal split planes 16–18 in the housing which is provided along each of the said planes with two pairs of split bearings, designated with a common numeral 19. As most clearly seen from FIG. 2, each pair of split bearings 19, when seen in the horizontal direction, receives the opposite ends of a stator shaft 20 which is held stationary by means of dowel pins 21. The shaft 20 carries thereon a stator 22 fitted with a conventional stator core and winding 23, for instance, delta-connected, which is adapted to be fed, preferably, from a commercial current source, such as three-phase, 50- or 60-cycle, 220- or 440-volt network as will be more fully described hereinafter with reference to FIGS. 6–7. An eccentric rotor 24 provided with a conventional rotor core and winding 25, represented only schematically, is mounted rotatably on the stator shaft through the intermediary of antifriction bearings 26 and 27.

Although only one eccentric rotor-motor unit has been illustrated in full section, it is to be noted that a construction similar to that described so far is employed in each of the remaining five units. In the position shown, all of the rotors have the thickest wall parts positioned in their lowest position. Each rotor 24 has rigidly fixed at its one end a synchronizing gear 28 which may serve as a transmission means at a specific stage of the operation. As seen from FIGS. 1 and 2, each of the rotor units, six in total, is provided with a similar gear, and each of the gears is kept in meshing relation with two or three gears of neighbouring units. When the rotors are rotated 180 degrees from the position shown, the thickest parts of the rotor walls are situated at their uppermost position, wherein the centrifugal forces induced by the rotating eccentric masses are directed naturally in the upward direction. On the contrary, when the masses of all the rotary units are positioned 90 degrees apart from that shown, the centrifugal forces of each pair of units, taken in the horizontal direction, will be balanced out completely relative to each other.

The construction of each of the vibration generator units VG–1 through VG–6 may be more clearly seen from FIG. 3, wherein such a unit is shown on a larger scale and parts similar to those shown in FIGS. 1 and 2 are denoted by the same reference numerals. As seen, the stator and the rotor are of laminated design for minimizing possible eddy current losses.

As shown in FIG. 6a, the three pairs of motor units incorporated in the vibration generator in the above-mentioned way, and designated with VG–1—VG–6 in that figure are electrically connected in parallel with each other to a commercial three-phase A.C.-current source 30. Volt meter 31 and indicator lamp 32 are branched off from any selected two lines of the current source, which is provided with a main manual switch 33 as shown. Leads 34 and 35, including therein safety fuses 36 and 37, respectively, are branched off from two lines of the three phase current source, so as to constitute a control circuit shown in FIG. 6b. A current transformer 39 is coupled with a line of the motor circuit and establishes a circuit which includes ammeter 38, as conventional.

In order to operate the vibration generator, main switch 33 is first closed. For the time being, units VG–1—VG–6 are not energized on account of the provision of relay switches m–1, m–2 and m–3 which are controlled by relay coils M–1, M–2 and M–3, respectively, which are inserted in the control circuit shown in FIG. 6b.

When push button P–1 is depressed, current flows from the power supply source through leads 34, 41 and 42 to 35, whereby relay M–1 is energized so as to close switch m–1 for the actuation of the first pair of units, VG–1 and VG–2.

Other motor units VG–3—VG–6 also start to rotate on account of the provision of the synchronizing gears. Even when finger pressure upon button P–1 is released, relay M–1 is kept energized by closure of a related relay contact m1–1 inserted in line 43 which includes therein further a time relay T–1, the latter being now energized.

After a certain time period, say 20 seconds, during which the starting peak current to vibration generator units VG–1 and VG–2 has been decreased to a smaller value, time relay T–1 will operate so as to actuate its relay contact t–1 included in line 44. Upon the closure of contact t–1, relay coil M–2 in the same line is energized so that relay contacts m–2 and m2–1 are closed and time relay T–2 is energized.

After a predetermined time limit, say 10 seconds, and when the starting current of the related two pairs of vibration generator units has been reduced to the normal running value, time relay T–2 will operate so as to close its contact t–2 and to energize relay coil M–3 included in line 46 of the third control stage. By the actuation of coil M–3, contact m–3 is closed and thus units VG–5 and VG–6 are supplied with drive current. The third control stage including line 46 is also kept alive by the closed, holding contact m3–1.

If an overcurrent should flow through units VG–1 and VG–2 for one minute or more, thermal overload relay Th–1 will be actuated so as to open its relay contact th–1 included in lead 41 so that the control circuit including relays M–1, M–2 and M–3 is deenergized, thus switches m–1, m–2 and m–3 are opened simultaneously to stop all the vibrator generator units.

This operative principle applies to overload relay Th–2 and Th–3, respectively, which are arranged to control contacts th–2 and th–3, respectively, inserted in lead 41 in series with contacts th–1.

It will be clear that by the stepped starting operation of the motor units, otherwise large initial starting currents may be considerably decreased.

During the synchronized rotation of the eccentric rotors, the centrifugal forces thus induced are balanced out horizontally, yet providing effective forces in the vertical direction as easily conceivable by those skilled in the art.

When it is desired to stop the machine, push button P–2 is depressed. When the daily job has been completed, main switch 33 is opened in a conventional manner.

For lighter jobs, the intermediate pair of motor units with its housing part may be dismantled from the vibration generator. Correspondingly, one or more intermediate pairs of motor units, with their related housing parts, may be easily added and assembled together for heavier job. This convenience may be easily enjoyed thanks to the split construction of the vibrator housing 10 in combination with the employment of a plurality of contained motor pairs.

The vibration generator is highly adapted for use as a pile driver which use will now be described hereinbelow with reference to FIGS. 4–5.

In this case, a hydraulic chuck or pile gripper attachment 50 is detachably attached to the lower end of the vibrator assembly by means of a plurality of fixing bolts 53, said attachment being fitted with both a stationary jaw 51 and movable jaw 52 cooperating therewith for gripping therebetween the head of a pile, not shown. Movable jaw 52 is carried on the projecting end of a piston 54 movably fitted in a hydraulic cylinder 55 which is rigidly supported in a casing 56 bolted onto the attachment. Hydraulic supply and discharge pipes 57 and 58, shown schematically only by their positions are hydraulically connected with operating chambers, not shown, of the cylinder. The construction and function of such a hydraulic pile gripper is rather conventional, so that no further description thereof appears to be necessary.

In order to drive a pile, held upright on the ground surface, into the earth, the vibrator assembly so far described is attached to the lower end of a hoist cable, not shown, suspended from a mast or the like, again not shown, and placed directly above the pile head to such a position ready for hydraulically gripping the latter. For this purpose, a fixture 59 for the cable is bolted onto the top of the vibrator assembly, as shown in FIGS. 1 and 2. Then, the hydraulic chuck is operated in a conventional manner to firmly grip the head, and the hoist cable is lightly slackened. When the motor units of the vibrator are started in the above described way, oscillative movement of the assembly thereby caused to take place is transmitted to the pile so as to drive it into the earth. When, on the contrary, it is desired to draw an already driven pile out from the earth, the preparative operation is substantially same as before, yet with such exception that a spring damper, for instance, is placed between the lower end of the hoist cable and the fixture 59 and the suspension cable is kept always tensioned during the whole operating period, again as is commonly known.

The vibration generator according to this invention can be used in a number of various applications. FIGS. 7–14 show schematically several usages thereof:

FIG. 7 shows a combination of the vibrator V with a sand piler S, while in the arrangement shown in FIG. 8 the vibrator is combined with a cutting bit 61 for cutting sand stone.

In FIG. 9, two vibrators V–1 and V–2 are mounted fixedly on a casing tube 62 for the formation of a concrete pile in the earth by means of ready-mixed concrete materials. In the arrangement shown in FIG. 10, the vibrator is mounted rigidly on the top of a water jet piling bit 64 placed within a casing tube 65. FIGS. 11–13 represent possibilities of the application of the vibrator V onto a soil tamper, a vibrating screen and a tamping roller, respectively. The function and purpose of these application will be easily understood by those skilled in the art by a glance at these illustrating drawings. In the application shown in FIG. 14, the vibrator is attached to a hopper 63 for the acceleration of feed of the contained material from a bottom feed opening of the hopper.

These application modes are shown naturally only by way of example and various further modes will easily occur to those skilled in the art.

In use of the vibrator, it may frequently be necessary to feed the machine with currents with different frequencies one after another as the job site varies. If, for instance, the machine has been designed for operation with 50-cycle current at an optimal efficiency, an overload condition may arise upon energization with a higher frequency current such as 60-cycle current.

Figure 15A:
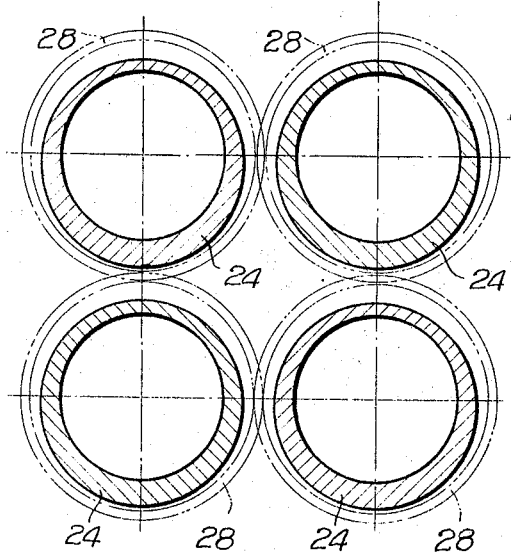
FIGS. 15a, 15b and 15c are schematic views of regular and off-center arrangements of the eccentric rotors of a 4-rotor vibration generator according to this invention.

In FIG. 15a, a four-rotor unit is shown, only schematically, in its rest position. It is assumed that this unit has been designed for operation with 50-cycle current as described above. All the thickest parts of the eccentric rotors are directed exactly downwards.

Figure 15B:
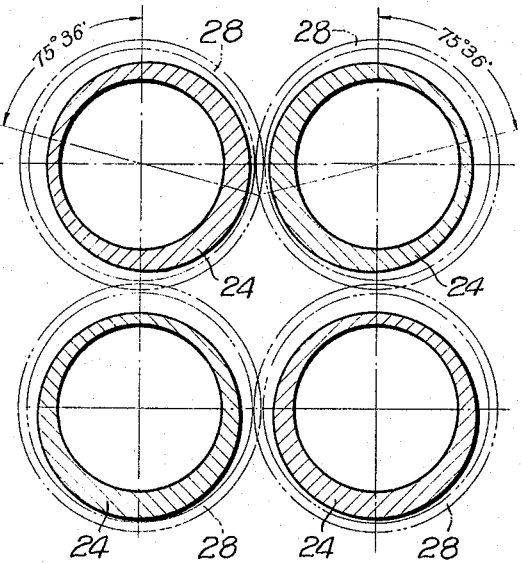
Figure 15C:
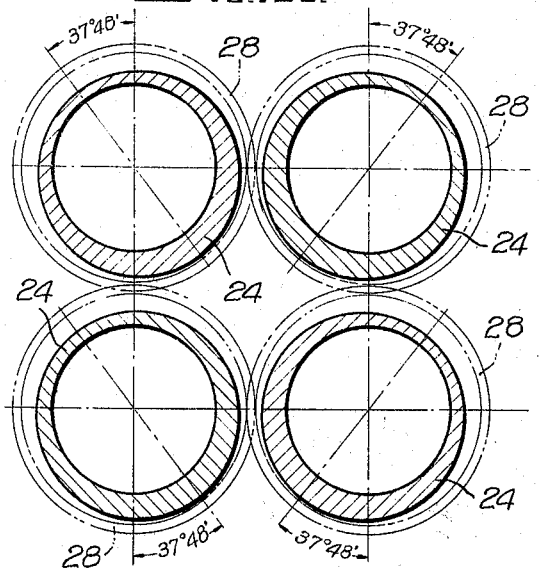

When the machine is to be fed with 60-cycle current, the upper pair of rotors is re-assembled so as to establish an offset, yet symmetrical a, arrangement thereof, while the lower eccentric masses are kept in their rest position, as shown in FIG. 15b. In this case, the offset angle amounts to 75°–36' as shown, when assembling. When assembled, the upper and lower pairs of the rotors are influenced by gravity and an offset position common to all the four rotors is naturally brought about, and thus the offset angle will be reduced to 37°–48' as shown in FIG. 15c. These numerical figures are also given only by way of example, and thus with increase or decrease in the number of the eccentric masses and/or the current frequency they are naturally modified to meet the local and occasional requirements. When one or more pairs of the eccentric masses are set and assembled in an offset arrangement as illustrated above, the effective vertical components of the developed centrifugal forces while the machine operates will be reduced accordingly and the required decrease in the oscillatory output of the machine may be attained in a highly simlified manner so as to meet the occasional frequency compensation.

Although substantially only one preferred embodiment of the invention and a limited number of applying possibilities of the vibration generator according to this invention have been illustrated in the accompanying drawings and described in the foregoing specification, it is to be expressly understood that the invention is not limited thereto in any way. Various changes may also be made in the design and arrangement of the parts without departing from the spirit of the invention and the scope of the appended claims, as the same will now be understood by those skilled in the art.

For instance, each two of the adjoining split housing sections may be fitted therein with an even number, more than two as was shown and described, of the motor-rotor units for heavier jobs. Further, the vibration generator may be used with success as a vibrating hammer.

The invention having thus been described, that which is believed to be new and for which protection by Letters Patent is desired, is:

1. A vibration generator comprising, in combination, a housing including a plurality of housing sections congruently superposed at separation planes, there being a pair of end sections and at least one intermediate section; fastening means arranged to disengageably connect said end sections and at least one intermediate section in superposed relation; the adjoining edge surfaces of said housing sections being formed with mating shaft seating surfaces arranged to receive at least one pair of parallel shafts at each separation plane; shafts fixedly seated in each of said seating surfaces; a plurality of stator cores each fixedly mounted on a respective shaft and each having a stator winding thereon arranged for connection to a source of electric potential; a plurality of eccentric rotor shells each rotatably mounted on a respective shaft and each having a rotor winding on an inner surface which is concentric with the associated stator, for rotation of said shells upon energization of the associated stator winding; the eccentric masses of the shells of each pair being arranged in dynamically balanced opposition along the plane including the respective shafts; and gearing interconnecting said shells for conjoint synchronous rotation, with the two shells of each pair rotating in opposite directions.

2. A vibration generator comprising, in combination, a housing including a plurality of housing sections congruently superposed at separation planes, there being a pair of end sections and at least one intermediate section; fastening means arranged to disengageably connect said end sections and at least one intermediate section in superposed relation; the adjoining edge surfaces of said housing sections being formed with mating shaft seating surfaces arranged to receive at least one pair of parallel shafts at each separation plane; shafts fixedly seated in each of said seating surfaces; a plurality of stator cores each fixedly mounted on a respective shaft and each having a stator winding thereon arranged for connection to a source of electric potential; a plurality of eccentric rotor shells each rotatably mounted on a respective shaft and each having a rotor winding on an inner surface which is concentric with the associated stator, for rotation of said shells upon energization of the associated stator winding; the eccentric masses of the shells of each pair being arranged in dynamically balanced opposition along the plane including the respective shafts; gearing interconnecting said shells for conjoint synchronous rotation, with the two shells of each pair rotating in opposite directions; switching means selectively operable to energize said stator windings, said switching means initially energizing only one pair of stator windings and energizing additional pairs of stator windings in succession as the starting current for the immediately preceding energized pair of stator windings decreases to the running current.

3. A vibration generator comprising, in combination, a housing including a plurality of housing sections congruently superposed at separation planes, there being a pair of end sections and at least one intermediate section; fastening means arranged to disengageably connect said end sections and at least one intermediate section in superposed relation; the adjoining edge surfaces of said housing sections being formed with mating shaft seating surfaces arranged to receive at least one pair of parallel shafts at each separation plane; shafts fixedly seated in each of said seating surfaces; a plurality of stator cores each fixedly mounted on a respective shaft and each having a stator winding thereon arranged for connection to a source of electric potential; a plurality of eccentric rotor shells each rotatably mounted on a respective shaft and each having a rotor winding on an inner surface which is concentric with the associated stator, for rotation of said shells upon energization of the associated stator winding; the eccentric masses of the shells of each pair being arranged in dynamically balanced opposition along the plane including the respective shafts; and gearing interconnecting said shells for conjoint synchronous rotation, with the two shells of each pair rotating in opposite directions; said gearing comprising annular gears on each shell concentric with the associated shaft, the annular gears on the shells of each pair meshing with each other.

4. A vibration generator comprising, in combination, a housing including a plurality of housing sections congruently superposed at separation planes, there being a pair of end sections and at least one intermediate section; fastening means arranged to disengageably connect said end sections and at least one intermediate section in superposed relation; the adjoining edge surfaces of said housing sections being formed with mating shaft seating surfaces arranged to receive at least one pair of parallel shafts at each separation plane; shafts fixedly seated in each of said seating surfaces; a plurality of stator cores each fixedly mounted on a respective shaft and each having a stator winding thereon arranged for connection to a source of A.C. electric potential; a plurality of eccentric rotor shells each rotatably mounted on a respective shaft and each having a rotor winding on an inner surface which is concentric with the associated stator, for rotation of said shells upon energization of the associated stator winding; the eccentric masses of the shells of each pair being arranged in dynamically balanced opposition along the plane including the respective shafts; and gearing interconnecting said shells for conjoint synchronous rotation, with the two shells of each pair rotating in opposite directions; the annular positions of the maximum eccentricities of one pair of shells being angularly offset relative to the angular positions of the maximum eccentricities of an adjacent pair of shells to compensate for a change in frequency of the source of electric potential.

5. A vibration generator comprising, in combination, a housing including a plurality of housing sections congruently superposed at separation planes, there being a pair of end sections and at least one intermediate section; fastening means arranged to disengageably connect said end sections and at least one intermediate section in superposed relation; the adjoining edge surfaces of said housing sections being formed with mating shaft seating surfaces arranged to receive at least one pair of parallel shafts at each separation plane; shafts fixedly seated in each of said seating surfaces; a plurality of stator cores each fixedly mounted on a respective shaft and each having a stator winding thereon arranged for connection to a source of electric potential; a plurality of eccentric rotor shells each rotatably mounted on a respective shaft and each having a rotor winding on an inner surface which is concentric with the associated stator, for rotation of said shells upon energization of the associated stator winding; the eccentric means of the shells of each pair being arranged in dynamically balanced opposition along the plane including the respective shafts; and gearing interconnecting said shells for conjoint synchronous rotation, with the two shells of each pair rotating in opposite directions; said fastening means comprising plural tie bolts extending longitudinally of said housing through ears on each of said sections.

6. A vibration generator comprising, in combination, a housing including a plurality of housing sections congruently superposed at separation planes there being a pair of end sections and at least one intermediate section; fastening means arranged to disengageably connect said end sections and at least one intermediate section in superposed relation; the adjoining edge surfaces of said housing sections being formed with mating shaft seating surfaces arranged to receive at least one pair of parallel shafts at each separation plane; shafts fixedly seated in each of said seating surfaces; a plurality of stator cores each fixedly mounted on a respective shaft and each having a stator winding thereon arranged for connection to a source of electric potential; a plurality of eccentric rotor shells each rotatably mounted on a respective shaft and each having a rotor winding on an inner surface which is concentric with the associated stator, for rotation of said shells upon energization of the associated stator winding; the eccentric masses of the shells of each pair being arranged in dynamically balanced opposition along the plane including the respective shafts; gearing interconnecting said shells for conjoint synchronous rotation, with the two shells of each pair rotating in opposite directions; a fixture detachably secured to one of said end sections and arranged for connection with a suspension cable.

7. A vibrating generator comprising, in combination, a housing including a plurality of housing sections congruently superposed at separation planes, there being a pair of end sections and at least one intermediate section; fastening means arranged to disengageably connect said end sections and at least one intermediate section in superposed relation; the adjoining edge surfaces of said housing sections being formed with mating shaft seating surfaces arranged to receive at least one pair of parallel shafts at each separation plane; shafts fixedly seated in each of said seating surfaces; a plurality of stator cores each fixedly mounted on a respective shaft and each having a stator winding thereon arranged for connection to a source of electric potential; a plurality of eccentric rotor shells each rotatably mounted on a respective shaft and each having a rotor winding on an inner surface which is concentric with the associated stator, for rotation of said shells upon energization of the associated stator winding; the eccentric masses of the shells of each pair being arranged in dynamically balanced opposition along the plane including the respective shafts; gearing interconnecting said shells for conjoint synchronous rotation, with the two shells of each pair rotating in opposite directions; a hydraulic chuck detachably secured to one of said end sections and arranged for gripping the head of a pile to be driven into the earth.

8. A vibration generator comprising, in combination, a housing including a plurality of housing sections congruently superposed at separation planes, there being a pair of end sections and at least one intermediate section; fastening means arranged to disengageably connect said end sections and at least one intermediate section in superposed relation; the adjoining edge surfaces of said housing sections being formed with mating shaft seating surfaces arranged to receive at least one pair of parallel shafts at each separation plane; shafts fixedly seated in each of said seating surfaces; a plurality of stator cores each fixedly mounted on a respective shaft and each having a stator winding thereon arranged for connection to a source of electric potential; a plurality of eccentric rotor shells each rotatably mounted on a respective shaft and each having a rotor winding on an inner surface which is concentric with the associated stator, for rotation of said shells upon energization of the associated stator winding; the eccentric masses of the shells of each pair being arranged in dynamically balanced opposition along the plane including the respective shafts; and gearing interconnecting said shells for conjoint synchronous rotation, with the two shells of each pair rotating in opposite directions; a hydraulic chuck detachably secured to one end of said end sections and arranged for gripping the head of a pile to be driven into the earth; and a fixture detachably secured to the opposite end section for connection with a suspension cable.

No references cited.

MILTON O. HIRSHFIELD, *Primary Examiner.*

ORIS L. RADER, C. W. DAWSON, D. F. DUGGAN,
*Examiners.*